Figure 1:
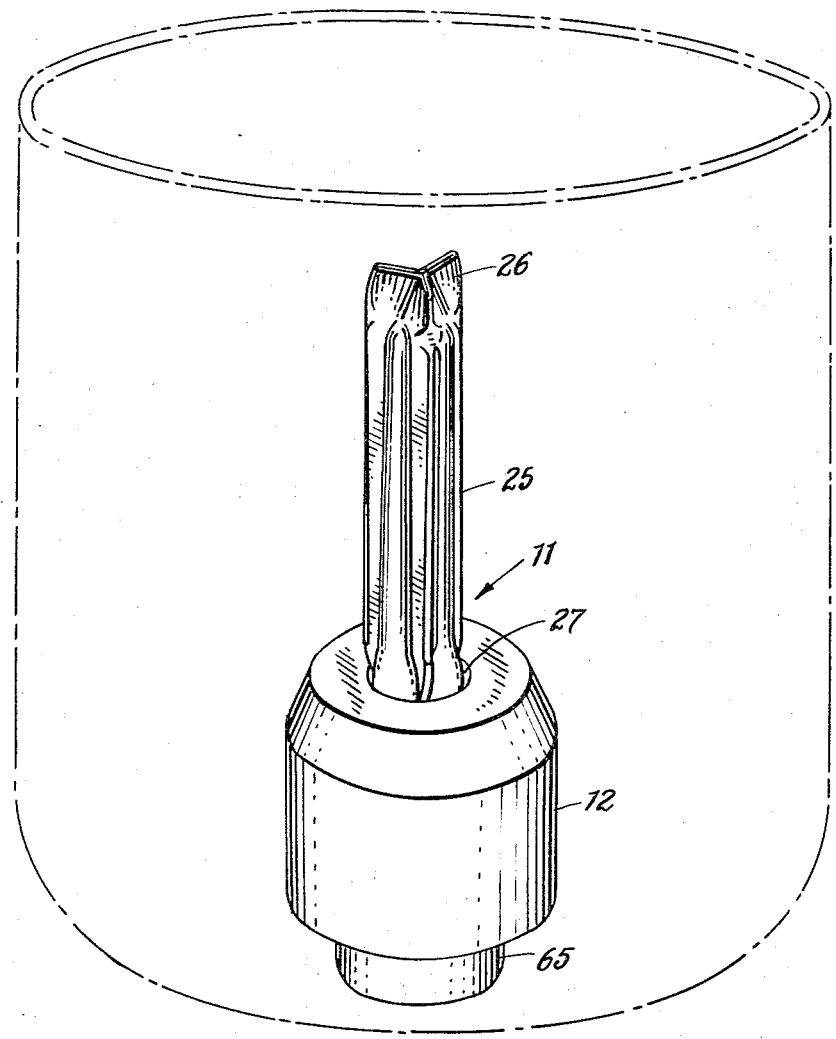

April 11, 1967   W. E. KELLER   3,313,264
PRESSURE INDICATOR
Filed Sept. 2, 1964   2 Sheets-Sheet 1

INVENTOR.
WILLIAM E. KELLER
BY
Morgan, Finnegan, Durham & Pine
ATTORNEYS

April 11, 1967  W. E. KELLER  3,313,264
PRESSURE INDICATOR

Filed Sept. 2, 1964  2 Sheets-Sheet 2

INVENTOR.
WILLIAM E. KELLER
BY
Morgan, Finnegan, Durham & Pine
ATTORNEYS

United States Patent Office 3,313,264
Patented Apr. 11, 1967

3,313,264
PRESSURE INDICATOR
William E. Keller, Fox Point, Wis., assignor to Ansul Chemical Company, Marinette, Wis., a company of Wisconsin
Filed Sept. 2, 1964, Ser. No. 393,867
4 Claims. (Cl. 116—70)

This invention relates to a pressure indicator for indicating when a predetermined pressure differential has been reached. More particularly, the present invention indicates when a pressurized medium falls below a predetermined value. While the invention is particularly well suited for signalling loss of operating pressure in sealed and stored pressure type fire extinguishers, it may be applied to other pressurized mediums, and can be used with pressures of almost any magnitude to signal a reduction in pressure below a predetermined value.

In applications where it is critical that pressures are maintained above predetermined minimum values, such as, for example, in pressure type fire extinguishers, it is important to provide a pressure indicating means for signalling a reduction in pressure below the minimum value which is both reliable and which may be easily inspected at periodic intervals.

The present invention comprises: a pressure indicator which is simple in construction, relatively insensitive to shock and vibration or ambient temperature changes, operable in any position, and completely sealed from both the pressurized medium and the atmosphere.

In accordance with this invention a pressure indicator is provided having a pressure indicator which is snap-released from a set, first position to an unset, second position when the pressure of a pressurized medium falls below a predetermined minimum value. The pressure indicator in accordance with this invention can provide a visual or audible signal either adjacent to or remote from the pressure indicating device. As will be seen hereinafter, in the embodiment disclosed in the specification and drawings the pressure indicator provides a visual signal immediately adjacent the pressure medium. It will be apparent, however, to those with ordinary skill in the art that the invention is not limited to this particular embodiment.

In accordance with this invention a snap-releasable pressure indicator is provided having a flexible diaphragm member surrounding an indicator element axially movable therein and spring biased toward a visible position, the diaphragm member transmitting the pressure of the pressurized medium to the indicator element to normally hold the indicator in a spring-loaded position. When a predetermined pressure differential exists between the inside and outside of the envelope and more specifically, when the pressure outside the envelope drops below a predetermined level the indicator is released from its spring loaded first position and operates a desired signal.

Briefly described, the present invention comprises a novel visual pressure indicator in which a flexible, pressure sealing diaphragm or envelope member transmits the pressure of a pressurized medium to an indicator element axially movable therein and spring biased towards a visual position. At pressures above a predetermined magnitude, the diaphragm or envelope member frictionally engages the movable indicator element with sufficient force to overcome the axial force of the spring and maintains the indicator element in a normal position of concealment. When the pressure falls below the predetermined magnitude, the restraining force of the diaphragm member is reduced below the axial force exerted by the spring and the spring displaces the indicator element to the visual indicating position, thereby signalling the reduction in the pressure of the pressurized medium below the predetermined magnitude.

With the foregoing in mind it is an object of the present invention to provide a new and improved pressure indicator.

Another object of this invention is to provide a new and improved pressure indicator for indicating when the pressure within a container is reduced to a predetermined level.

Another object of this invention is to provide a new and improved pressure indicator operable when a predetermined pressure differential is reached.

A still further object of this invention is to provide a new and improved pressure indicator wherein an indicator which is maintained by the pressure within a container in a first position is automatically moved to a second or alarm operating position when the pressure is reduced to a predetermined level.

A further object of this invention is to provide a new and improved pressure indicator wherein an indicator element is engaged by pressure transmitting means to maintain the element in a first position and wherein spring means move said indicator element to a visual position when the pressure falls below a predetermined level.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

It will be understood that the foregoing general description and the following detailed description as well are exemplary and explanatory of the invention but are not restrictive thereof.

The accompanying drawings, referred to herein and constituting a part hereof, illustrate one embodiment of the invention, and together with the description, serve to explain the principles of the invention.

Figure 4:
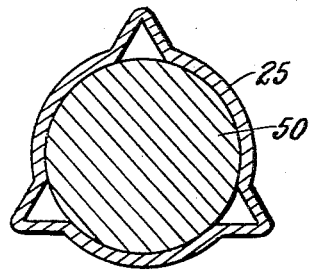
Figure 5:
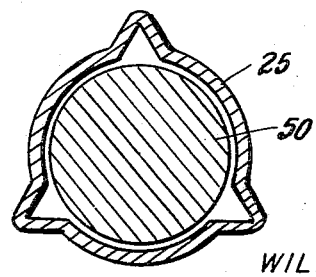
Figure 2:
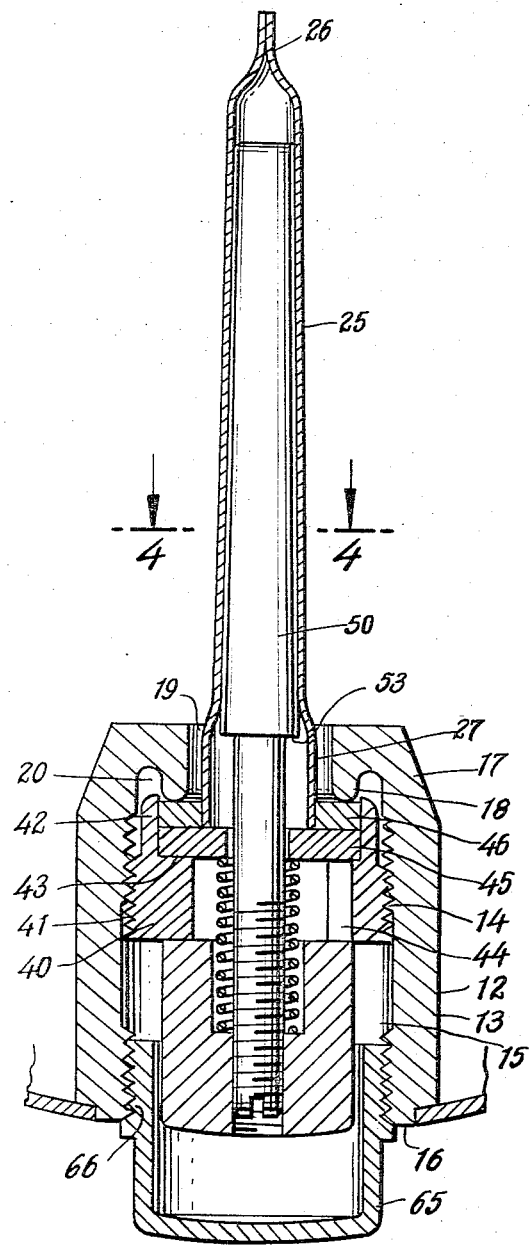
Figure 3:
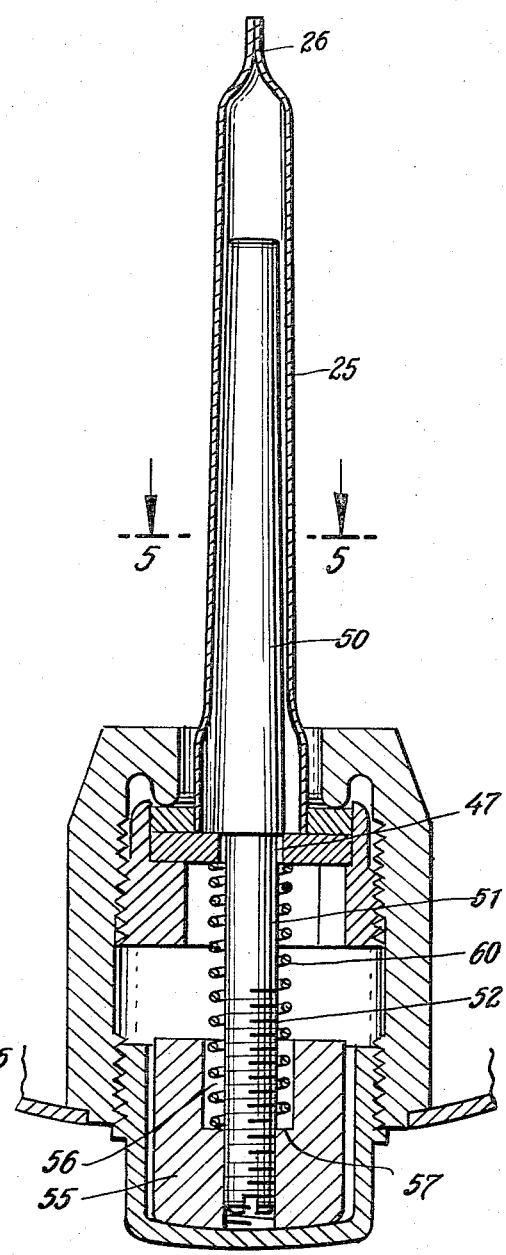

Of the drawings:
FIGURE 1 is a perspective view of a pressure indicator embodying my invention, diagrammatically illustrated as positioned within a pressurized chamber;
FIGURE 2 is a vertical sectional view of the pressure indicator illustrated in FIGURE 1, showing the elements thereof in the normal, set position;
FIGURE 3 is a view similar to FIGURE 2, but illustrating the indicator elements in the unset position;
FIGURE 4 is an enlarged cross-sectional view taken along line 4—4 of FIGURE 2; and
FIGURE 5 is an enlarged cross-sectional view taken along line 5—5 of FIGURE 3.

Referring now more particularly to the embodiment of the invention shown in the accompanying drawings, there is illustrated in FIGURE 1 a pressure chamber 10 having positioned therein a pressure indicator, designated generally by reference numeral 11. While pressure chamber 10 preferably refers to a pressure-type fire extinguisher, it will be understood that it may represent any sealed chamber having a pressurized fluid therein, or having a fluid therein capable of becoming pressurized.

Pressure indicator 11 includes main housing means mounted to a pressure chamber 10; transparent cover means mounted to the main housing means and extending externally of the pressure chamber 10; pressure transmitting means mounted to the main housing means and extending within the pressure chamber 10; and indicator means mounted for axial movement within the pressure transmitting means, main housing means, and cover means.

As here preferably embodied, the main housing means comprises a generally cylindrical housing body 12 forming a cylindrical chamber 15. Wall 13 of the housing body is internally threaded as shown at 14 substantially continuously along the length of the chamber 15. The housing body is mounted and sealed to the pressure chamber wall in any well known manner so that end 16 is flush with the surface of the pressure chamber wall. Transparent cover means 65 having external threads 66 is threadedly mounted onto end 16 of the housing body, forming a sealed, externally extending, visual signal station, more fully discussed hereinbelow.

The inner end 17 of housing body 12 is formed with an annular bead 18 spaced from the main housing wall 13 and extending into chamber 15, thereby defining an opening 19 communicating with chamber 15 and an annular recess 20.

Means are provided in sealing engagement with housing body 12 for transmitting the pressure in a pressure chamber against an axially movable, spring-biased indicator element to restrain the element from movement.

As here preferably embodied, the pressure transmitting means comprises a tapered, flexible, generally triangularly-shaped, diaphragm or envelope 25, which is crimped and closed at end 26 and which has a cylindrical shape at open end 27. The indicator means comprises a tapered plunger element 50, of the same approximate length and degree of taper as diaphragm 25, a shank 51 partially threaded at 52, and an indicator knob 55 threadably mounted to the end of shank 51 remote from the plunger element 50. Shank 51 extends through the central opening 47 in stop washer 45 into the housing body 12, the length of extension being controlled by shoulder 53 formed between the plunger 50 and shank 51. Indicator knob 55 includes an internal cylindrical recess 56 with an annular shoulder 57. A coiled steel spring 60 is mounted about shank 51 between stop washer 45 and shoulder 57 of knob 55. It will thus be seen that spring 60 normally urges plunger 50 in a direction out of the diaphragm 25.

Triangular diaphragm 25 is mounted to the housing body 12 whereby its outer surfaces are exposed to the higher pressure of a pressurized medium and its interior is vented to a lower pressure. While the interior of the envelope is generally vented to atmospheric pressure, this is not necessarily required in the practice of the present invention. Hence, the present device in accordance with this invention can detect and indicate a pressure differential between the inside and outside of the envelope. Each of the three sides of the triangular diaphragm deflect proportionally with a pressure differential between its interior and exterior. As the exterior of the diaphragm is exposed to pressure, the flat sides tend to deflect and bear against the plunger with a force proportional to the pressure, producing a frictional force that resists axial movement of the plunger and indicator knob. This frictional force is a function of the pressure force and the coefficient of friction between the sides of the envelope and the plunger surface. An axial force is applied toward the larger end of the tapered plunger by the spring 60; however, it will be apparent that the plunger cannot move until the sum of the frictional forces is less than the axial force of the spring. Thus, in the preferred embodiment of this invention the plunger is insensitive to any pressure change except to descending pressure changes passing through the predetermined value.

The plunger surface and diaphragm are preferably tapered to provide a snap acting release of the plunger from the diaphragm. When the spring force overcomes the static friction force, the plunger moves further reducing the friction force by (1) the changing of static to dynamic coefficients of friction, and (2) a sharp reduction of the pressure forces on the plunger due to the transfer of pressure loads to the sides of the diaphragm.

The use of a tapered geometry for the diaphragm and plunger also increases the clearance rapidly as soon as the plunger begins to travel in the diaphragm and is a means of accurately adjusting the engagement of the plunger in the envelope. The depth of engagement controls the clearance between the plunger and the diaphragm at zero pressure differential, therefore controlling the friction force therebetween for holding the plunger against axial movement. It will be seen that smaller clearances raise the minimum pressure value for releasing the indicator.

Diaphragm 25 is mounted in sealed relationship to the housing body 12 by means of seal mounting ring 40, stop washer 45, sealing ring 46 and bead 18. Seal mounting ring 40 has external threads 41 mating with threads 14 of the housing body, internal opposed flanges 44 (only one of which is illustrated) a cylindrically extending mounting boss 42, and an annular shoulder 43 between boss 42 and ring 40. Stop washer 45 and sealing ring 46 are carried by shoulder 43 and boss 42 of seal mounting ring 40. Diaphragm 25 is attached to sealing ring 46 at its cylindrical end 27 by soldering or other similar manner.

Seal mounting ring 40 is threaded into chamber 15 by a suitable flange wrench (not shown) bearing against opposed flange surfaces 44 until sealing ring 46 engages annular bead 18 on housing body 12. As sealing ring 46 bears against bead 18, mounting boss 42 extends into recess 20, thereby permitting tight sealing engagement between housing body 12, sealing ring 46, and diaphragm 25.

Assembly of the illustrated embodiment of the invention may be simply carried out as follows. Triangularly-shaped diaphragm 25 is soldered at its open cylindrical end 27 to sealing ring 46 whereupon plunger 50 is inserted into the diaphragm. Stop washer 45 followed by mounting ring 40 is then slipped over shank 51 whereby the stop washer and sealing ring 46 came to rest on shoulder 43 within mounting boss 42. Diaphragm 25 with plunger 50 placed therein is then inserted in housing body 12 through end 16 and travelled through opening 19 in the opposite end 17 until mounting ring 40 threadedly seals sealing ring 46 against bead 18, plunger 50 being held within diaphragm 25 by shoulder 53 resting against stop washer 45. Thereafter, coil spring 60 is slipped over shank 51 to rest against stop washer 45 and indicator knob 55 is screwed onto shank 51. The indicator is now completely assembled, except for threading the transparent cover 65 into place, and is therefore ready to be "set" or "cocked." This may be done by manually pushing knob 55 against the outward force of spring 60 thereby inserting plunger 50 completely within diaphragm 25; when the pressure within the pressure chamber has been increased above the predetermined minimum value, the frictional force of diaphragm 25 against the plunger 50 overcomes the axial force of spring 60 and plunger 50 is held in the set position. At this time the indicator may be readily calibrated to the desired "setting" or minimum pressure value by adjusting the number of turns of indicator knob 55 onto shank 51. This adjustment controls the clearance between the plunger and the diaphragm under conditions of no pressure, and consequently the pressure at which the envelope no longer engages the plunger sufficiently to resist the spring forces. Once the indicator is so calibrated, it will "trip" only when the pressure falls below the minimum setting value. Repeatability is obtained by maintaining the indicator knob at the same position thereby maintaining a uniform length of the spring in the locked position. After calibration and setting, transparent cover 65 may then be threaded into place, thereby sealing the housing body and serving as the visual signal station.

In operation, the device is assembled, mounted to a pressure chamber, and cocked or set as previously described. Since the indicator elements are relatively insensitive to temperature changes, shock and vibration, changes of position, and are completely sealed from foreign material and corrosive action, the plunger element will be held in the set position with the indicator knob concealed from view, as long as the pressure in the pressure chamber is maintained above a predetermined value. When, however, the pressure falls below the minimum desired value, the restraining force of the diaphragm is overcome by the axial force of the spring, the tapered plunger snaps out of the diaphragm, and the indicator knob strikes the transparent cover, visually signalling the reduction of pressure in the pressure chamber. The indicator may be reset only when the pressure within the chamber is again raised above the predetermined value. It will be understood, of course, that in its broadest aspects the present invention is not limited to a visual indicator adjacent the pressure indicator device. In other words, the plunger 50 could operate a switch which in turn operates a visual or audible alarm at any desired location.

While the invention is in no manner limited to any particular size or to the use of particular materials, it will be understood to those skilled in the art that the choice and dimensions of materials will in large part depend upon the pressures involved, the nature of the fluid of the pressurized medium, and like considerations.

It will be understood, therefore, that the invention in its broader aspects is not limited to the specific embodiment herein shown and described but departures may be made therefrom within the scope of the accompanying claims, without departing from the principles of the invention and without sacrificing its chief advantages.

What is claimed is:

1. A device for indicating a reduction of pressure in a pressurized container to a predetermined level, comprising: main housing means adapted to be sealingly affixed to said pressurized container; means sealingly mounted at one end of said housing means for providing a pressure reduction signal station; a flexible, pressure transmitting diaphragm member sealingly mounted to the other end of said housing means and adapted to extend into said pressurized container; indicator means for signalling a pressure reduction at said signal station including an elongated plunger member mounted for axial movement within said diaphragm means and said housing means; said flexible diaphragm member adapted to frictionally engage the longitudinally extending side surfaces of said plunger of said indicator means when the pressure in said container is above a predetermined value thereby normally maintaining said indicator means in a first position remote from said signal station; and means axially biasing said indicator means in a direction toward said signal station, whereby when the pressure in said container is below said predetermined value said diaphragm member releases said plunger and said indicator means is positioned at said signal station thereby signalling said pressure reduction.

2. A device as claimed in claim 1, wherein said means for providing a pressure reduction signal station comprises transparent cover means visually observable from outside said pressurized container and said indicator means includes an indicator knob mounted to said plunger, said knob being exposed to view at said transparent cover means when the pressure in said container is below said predetermined valve.

3. A device as claimed in claim 1, wherein each of said plunger member and said flexible diaphragm member are tapered over a major portion of the length thereof, the degree of taper in each of said members being substantially equivalent.

4. A device as claimed in claim 1, including means for longitudinally adjustably mounting said plunger member so as to adjust the length of said longitudinally extending side surfaces of said plunger member which is frictionally engaged by said flexible diaphragm member.

References Cited by the Examiner
UNITED STATES PATENTS

| | | | |
|---|---|---|---|
| 2,664,750 | 1/1954 | McCrink | 73—409 |
| 2,669,707 | 2/1954 | Ehrman | 340—239 |
| 2,827,122 | 3/1958 | Clark. | |
| 2,842,087 | 7/1958 | Burns | 116—34 |
| 2,954,751 | 10/1960 | Barnes | 116—70 X |
| 2,992,653 | 7/1961 | Patterson | 137—228 |
| 3,011,470 | 12/1961 | Stoermer | 116—117 |
| 3,183,882 | 5/1965 | Preece | 116—70 |

LOUIS J. CAPOZI, *Primary Examiner.*